(12) United States Patent
Patterson

(10) Patent No.: US 6,465,397 B1
(45) Date of Patent: Oct. 15, 2002

(54) SYNTHETIC CROSSLINKED COPOLYMER SOLUTIONS AND DIRECT INJECTION TO SUBTERRANEAN OIL AND GAS FORMATIONS

(75) Inventor: Daniel Bruce Patterson, Huntersville, NC (US)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/502,637

(22) Filed: Feb. 11, 2000

(51) Int. Cl.$^7$ .................................................. C09K 3/00
(52) U.S. Cl. ................... 507/222; 507/225; 507/226; 507/227; 526/240; 526/287; 526/278
(58) Field of Search ...................... 507/222, 225, 507/226, 227; 526/240, 287, 278

(56) References Cited

U.S. PATENT DOCUMENTS

| | | | |
|---|---|---|---|
| 4,095,651 A | | 6/1978 | Chauveteau et al. ......... 166/294 |
| 4,309,523 A | | 1/1982 | Engelhardt et al. ......... 526/240 |
| 4,404,111 A | * | 9/1983 | Bi et al. .................... 507/225 |
| 4,406,799 A | * | 9/1983 | Hunter ....................... 507/225 |
| 4,451,631 A | * | 5/1984 | Engelhardt .................. 526/287 |
| 4,471,097 A | * | 9/1984 | Uhl et al. ................... 526/240 |
| 4,507,438 A | | 3/1985 | Obayashi et al. ........... 525/119 |
| 4,507,440 A | | 3/1985 | Engelhardt et al. ......... 525/218 |
| 4,518,745 A | * | 5/1985 | Engelhardt .................. 526/240 |
| 4,541,871 A | | 9/1985 | Obayashi et al. ........ 106/197.2 |
| 4,555,269 A | * | 11/1985 | Rao et al. ................... 507/225 |
| 4,573,533 A | * | 3/1986 | Ryles et al. ................. 507/226 |
| 4,619,773 A | * | 10/1986 | Heilweil et al. ............. 507/226 |
| 4,666,983 A | | 5/1987 | Tsubakimoto et al. ...... 525/119 |
| 4,718,491 A | | 1/1988 | Kholer et al. ............... 166/294 |
| 4,736,005 A | * | 4/1988 | Castner ....................... 526/240 |
| 4,737,541 A | * | 4/1988 | Stavenger ................... 526/240 |
| 4,785,028 A | * | 11/1988 | Hoskin et al. .............. 507/225 |
| 4,842,971 A | | 6/1989 | Sugaiwa et al. .............. 430/64 |
| 4,964,461 A | | 10/1990 | Shu ........................... 166/252 |
| 5,043,364 A | | 8/1991 | Moradi-Araghi et al. ... 523/130 |
| 5,079,278 A | | 1/1992 | Mitchell ..................... 523/130 |
| 5,086,089 A | | 2/1992 | Shu ........................... 523/130 |
| 5,116,421 A | * | 5/1992 | Ganguli ...................... 507/225 |
| 5,135,909 A | | 8/1992 | Stephans et al. ............ 507/121 |
| 5,140,076 A | | 8/1992 | Hatsuda et al. ............. 525/375 |
| 5,244,936 A | | 9/1993 | Mitchell ..................... 523/130 |
| 5,294,651 A | | 3/1994 | Sthephans ..................... 524/3 |
| 5,336,316 A | | 8/1994 | Dawson et al. ............. 106/724 |
| 5,379,841 A | | 1/1995 | Pusch et al. ................ 166/295 |
| 5,480,863 A | * | 1/1996 | Oakley et al. .............. 507/225 |
| 5,510,436 A | * | 4/1996 | Hille et al. ................. 526/240 |
| 5,531,993 A | * | 7/1996 | Griat .......................... 526/287 |
| 5,547,025 A | | 8/1996 | Ahmed et al. .............. 166/295 |
| 5,701,956 A | | 12/1997 | Hardy et al. ................ 166/295 |
| 5,905,100 A | | 5/1999 | Moradi-Araghi ........... 523/130 |
| 5,975,206 A | * | 11/1999 | Woo et al. .................. 507/225 |
| 6,228,812 B1 | * | 5/2001 | Dawson et al. ............. 507/225 |
| 6,124,245 A1 | | 9/2001 | Patel .......................... 507/120 |

FOREIGN PATENT DOCUMENTS

| | | |
|---|---|---|
| EP | 0 447 967 A2 | 9/1991 |
| EP | 0 577 931 A1 | 1/1994 |
| EP | 1 059 316 A1 | 12/2000 |
| WO | WO-A2-98/06929 | 2/1998 |
| WO | WO 00/20527 | 4/2000 |

OTHER PUBLICATIONS

Esp@cenet patent abstract for EP1059316.

* cited by examiner

*Primary Examiner*—Philip Tucker
(74) *Attorney, Agent, or Firm*—Richard P. Silverman

(57) ABSTRACT

What is disclosed is the preparation and use of synthetic water soluble copolymers useful in modifying the water permeability characteristics of subterranean hydrocarbon producing formations. The copolymers are in the form of dilute, pumpable, homogeneous, aqueous solutions and comprise a crosslinked synthetic copolymerizate with intramolecular and intermolecular crosslinking in a non-gelled state and a molecular size/shape corresponding to a K-value of 220–450.

38 Claims, No Drawings

SYNTHETIC CROSSLINKED COPOLYMER SOLUTIONS AND DIRECT INJECTION TO SUBTERRANEAN OIL AND GAS FORMATIONS

FIELD OF THE INVENTION

The invention pertains to the preparation and use of synthetic water soluble copolymers useful in modifying the water permeability characteristics of subterranean hydrocarbon producing formations.

BACKGROUND OF THE INVENTION

Water and oil or gas often exist in the same or adjacent formations. This water is often co-produced with the desired oil or gas, leading to operational problems. As water is produced and removed from the formation, the hydrostatic pressure within the formation that is exerted on the hydrocarbon content decreases, contributing to a decline in hydrocarbon production rates. Once above ground, the produced water must be separated from the sought-after hydrocarbon. Frequently, the water exists in an emulsion with the hydrocarbon, necessitating efforts to break the emulsion and remove the water fraction. The produced water also requires storage and/or disposal, which is often time consuming and expensive.

Efforts to minimize produced water and its associated problems are addressed conventionally in the art by the use of natural, semi-synthetic, and synthetic crosslinkable polymer solutions or dispersions. Synthetic water soluble or dispersible copolymers have been successfully used for so-called water shut-off purposes as well as in relative permeability modification applications (hereinafter for short, "RPM"). These methods involve the reduction in the flow of subterraneous water in the horizons with oil and/or gas near the well-bore. The use of water shut-off polymers thus leads to a stoppage of water feeds to a production well-bore, but usually also leads to a stoppage or significant reduction in hydrocarbon production in the treated zone. The present invention is directed mainly to RPM, wherein the permeability of water in the formation is minimized without causing a significant decline in oil and/or gas permeability.

In the conventional methods, crosslinkable polymers in aqueous solutions or dispersions are pumped into underground formations and undergo swelling and crosslinking reactions to develop desired gelation characteristics. The polymer adsorbs onto the porous solids, and the gel holds water within the gel structure to alter the migration behavior and reduce the amount of produced water. Conventionally, an aqueous solution containing a crosslinkable polymer is pumped into water and hydrocarbon producing formations so that they enter water zones within and adjacent to the formations. Crosslinking materials may is either be injected along with the crosslinkable polymer solution, or injected after the polymer has been injected.

The art includes various techniques and chemistries for achieving the desired subterranean swelled, crosslinked gels of the polymer solutions, generally leading to the formation of substrate-adhered gels which reduce or stop, as the intended result, the flow of water through the natural fractures and high permeability streaks in the formations.

Early examples of synthetic polymers are the partially hydrolyzed polyacrylamides possessing pendant carboxylate groups reactive with external crosslinking agents. Thermally stable, crosslinkable, carboxylate-containing polymers of acrylamide; copolymers of N-vinyl-2-pyrrolidone and acrylamide; terpolymers of sodium-2-acrylamido-2-methyl-propanesulfonate, acrylamide, and N-vinyl-2-pyrrolidone; and copolymers of sodium-2-acrylamido-2-methyl-propanesulfonate, acrylamide, and vinylacylamide have been suggested for use with an external crosslinking system to treat subterranean formations with high salinity and at elevated temperatures.

In the conventional method of altering the permeability of water in underground formations, the crosslinkable polymers are injected into a formation simultaneously with a selected crosslinking system, each typically in the form of aqueous solutions. The solutions permeate into the regions having the highest water permeability, crosslinking reactions proceed over the course of hours, resulting in an aqueous, (swelled) gel. Thermosetting phenol-aldehyde polymers are exemplary crosslinking systems used in combination with water-soluble crosslinkable polymer. Other crosslinking agents include multivalent metal compounds reactive with carboxyl-containing copolymers, for example, complexed chromium, zirconium, or titanium compounds. Complexing ligands are sometimes also utilized and are effective in delaying the onset of gelation.

Use is often made of polymers that are introduced in a solution into the porous formations, absorbed at the solid surfaces and penetrate into the pores so that they are suitable for reducing the water influx by friction.

U.S. Pat. No. 4,095,651 discloses the use of hydrolyzed polyacrylamides. It has been found, however, that this polymer type is mainly effective for water with a low salt content and breaks down in water with a higher salt content. In the presence of polyvalent ions these polymers have a tendency at high temperatures to form precipitates that can clog the pores of the rock formations.

U.S. Pat. No. 4,507,440 discloses water soluble polymers for enhanced petroleum recovery which are crosslinkable on addition of acid, resulting in crosslinks of the —NR—CH=N—CO— type. These polymers are employed in acidizing-stimulation of underground oil and gas formations. The polymers contain copolymerized acrylamide and formyl-amido-type comonomers. Thus, in-situ (underground) crosslinking in the well bore-hole occurred by co-injection of aqueous 15 wt. % HCl containing a mixture of water soluble copolymers, one being a copolymer of 2-acrylamido-2-methylpropanesulfonic acid-acrylamide-N-vinyl-N-methylacetamide and the other being acrylic acid-vinyl formamide-vinyl pyrrolidone copolymer. The crosslinked polymer gels are stable for days at 20–30° C. in acid media, but are easily hydrolyzed at 80–90° C.

U.S. Pat. No. 4,718,491 discloses the use of polysaccharides. These compounds, which are difficult to inject into the pore space, do effect a retardation or reduction of the water influx, but they allow only incomplete exploitation of the hydrocarbon deposits. They have been known to lose their effect at high temperatures.

U.S. Pat. No. 4,842,971 discloses the use of non-hydrolyzed acrylamide polymers or copolymers which are hydrolyzed by the subsequent introduction of an aqueous basic solution. This process has some drawbacks in terms of additional work for introducing a further solution in the well-bore and difficulties attendant in reaching the injected polymer solution by subsequent application of the basic solution. Corrosion of equipment from basic solutions are known. In addition, the efficacy of the polymer solution is contingent upon the extent of hydrolytic conversion by the basic solution.

Other examples of conventional methods and materials include those disclosed in U.S. Pat. No. 5,547,025. Therein, carboxylate-containing, water swellable polymers capable of gelling in the presence of crosslinking agent such as, for example, a multivalent metallic compound are exemplified.

U.S. Pat. No. 5,379,841 discloses methods for reducing or stopping water inflow from a deposit with the use of a copolymer comprising 2-acrylamido-2-methylpropane sulfonate and vinylacylamide, with optional anionic or cationic comonomers. The molecular weight of the copolymers can range from 50 thousand to 20 million. Optional anionic or cationiccomonomers are suggested for desired increased adhesion to different substrates. For formations in which pore diameters are smaller, molecular weights of the copolymer are suggested to be in the range of 50,000 to 3 million, and for formations having relatively larger diameter pore sizes, a molecular weight in the range of 3 to 20 million is suggested.

U.S. Pat. No. 5,701,956 teaches the use of a graft copolymer of a hydrophilic polymer and a phosphonate as a crosslinkable aqueous polymer in brine. The latent crosslinking function is selective to the water phase and not the oil phase. Polymer compositions for which phosphonate functional compounds are grafted thereto include polyacrylamide, copolymers containing acrylamide, partially hydrolyzed polyacrylamide and related copolymers, hydroxyalkylcelluloses, guar gum and derivatives thereof and other similar hydrophilic polymers. The latent or post-crosslinking function comprises a phosphonate salt or phosphonic acid monomer. The phosphonate in the graft copolymer crosslinks with the divalent metals in alkaline formation materials at pH levels above 7.

WO 98/06929 discloses compositions and RPM methods wherein a dispersion of (sub)micron-sized, water-swellable, cross-linked polymer particles is used to form a treatment fluid. The treatment fluid containing the water-swellable particles is injected into the subterranean formation. The excessive size constraint of the particles is overcome by using invert polymer emulsion or microemulsion processes to provide particles that are smaller in size than so-called super absorber particles, and smaller than that of the formation pore structures. Upon injection of a saline dispersion of the particles, optionally along with an inverting surfactant, the particles become trapped in the formation, and upon flow back of water, the particles swell in size and absorb into the formation. Thus a dispersion of small particles of a copolymer made from the emulsion polymerization of acrylamide, acrylic acid, methylene bisacrylamide, and dimethyldiallyl ammonium chloride are injected into subterranean formations where swelling takes place, restricting further water flow.

While crosslinkable and crosslinked, water-swellable copolymers, such as the above, are adapted in the state of the art for water permeability modification of subterranean formations, varying degrees of success are achieved due mainly to variable subterranean conditions, the physico-chemical response of the copolymers to these conditions, and the particle size of the dispersed copolymers. The conventional approach employs dispersed particles of copolymers containing selected monomers providing water swelling and/or crosslinking sites which activate when injected underground. The time-rate and extent of development of ultimately useful properties of copolymers after introduction underground is not exact. On interaction with the underground conditions, the development of useful properties such as substrate adhesion, water swelling, and gelation properties, and the effect of these developed properties on reducing water production and the extent of avoiding blockage of oil or gas flow, and other significant performance parameters, can be a matter of trial and error. A particular copolymer, or a particular form of a given copolymer, found useful for certain subterraneous formations may not develop the same properties or be as useful in other formations.

The insertion in the formation of an impenetrable barrier between the water and the well-bore or between the water and the oil or gas can block just as much oil or gas as water. The blockage components can be: cement, resins, suspensions of solid particles, paraffins or water-soluble polymers which become cross-linked in the subterranean formations. Prior to injection of such water shut-off treatments, it is often necessary to determine the location of the regions in the formation that are producing the undesired water. The water shut-off treatment must then be specifically placed in the targeted zones via zonal isolation techniques to avoid the unintentional placement of the water shut-off material in zones that produce substantial quantities of hydrocarbon.

A gelled solution of copolymer has a relatively extensive intermolecular network of crosslinking and is not useful for infusion into most porous subterranean formations, as the polymer fails to yield to the stress applied by conventional pumping pressures to adequately flow through the throats of the pore passageways. On the other hand, aqueous dispersions of micro-particles which are injected in an unswelled state, must be inverted on-site and injected in order to provide adequate penetration into subterranean pores which are only greater in diameter, and obviously, incomplete penetration is possible due to variations in the distribution of polymer particle size, salinity, changes in particle size over time, as well as the distribution of pore sizes in any given formation.

Solutions of crosslinkable polymers of relatively low molecular weight can be completely distributed throughout the porous formations, but lack sufficient permeability modifying properties unless further steps such as providing in-situ crosslinking are provided. Therefore a continuing need exists for improved material compositions and methods capable of selectively reducing the relative rate of water production from subterranean zones and oil and/or gas formations of varying degrees of porosity and pore sizes, and it would be of industrial importance to achieve RPM results with or without the need for insitu crosslinking.

SUMMARY OF THE INVENTION

In one aspect of the present invention there is provided a dilute, pumpable, homogeneous, non-gelled aqueous solution of a relative permeability modifying copolymer comprising a crosslinked synthetic copolymerizate, which has a balance of intramolecular and intermolecular crosslinking, that is readily injectable into the pores of subterranean formations under pumping pressures (injectivity) and that is characterized by having a molecular size/shape corresponding to a K-value of 220–450. The term "crosslinked" is used herein to describe a copolymer that is randomly, and uniformly crosslinked prior to injection into the well-bore. The term "insitu crosslinking" refers to the optional further crosslinking of some embodiments of the crosslinked copolymer of the present invention, such further crosslinking taking place after injection into the subterranean formation.

In another aspect there is provided the process for modifying the permeability of subterranean water-producing formations comprising the injection of dilute homogeneous aqueous solutions of a crosslinked, anionic copolymerizate comprising a major amount (>50% by weight) of copolymerized acrylic amide and sulfonated vinyl comonomer and a particular amount of nonionic crosslinking monomer to provide a copolymerizate which forms a homogeneous aqueous solution and a K-value as specified above.

In another and preferred aspect, there is provided an anionic, crosslinked, water-soluble, synthetic copolymer which forms a homogeneous, aqueous readily flowable solution under reasonably achieved pumping pressures, the copolymer comprising greater than 50% by weight of three copolymerized comonomer components: sulfonated vinyl monomer, N-substituted α,β-unsaturated carboxylic amide, and an effective amount of polyethylenic unsaturated copolymerizable comonomer (XL), such amount of XL selected to provide a random and uniformly crosslinked copolymer characterized by having a K-value in the range of from 220–450.

In another aspect, there is provided an aqueous, dilute, agitated solution polymerization method for making anionic, crosslinked, water-soluble, synthetic copolymerizates resulting in a readily pumpable and injectable, homogeneous, aqueous solution, said copolymer having a K-value, measured according to the test specified hereinbelow in the range of from 220–450, and preferably a K-value of from about 230 to about 300, and most preferably K-value of 240 to 290.

In yet a further aspect there is provided an amphoteric copolymer comprising either of the above anionic copolymers including further, a minor amount (<50% by weight) of a cationic comonomer.

DESCRIPTION OF THE PREFERRED EMBODIMENTS

In one aspect, the crosslinked, water-soluble anionic copolymer which forms a non-gelled, homogeneous aqueous solution, according to the invention, comprises the following incorporated randomly as a copolymerizate:

(A) 1% to 90%, preferably 20% to 75%, more preferably, 30% to 65%, by weight of comonomer units (1) having the copolymerizable structure represented by (1):

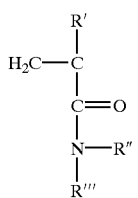

(1)

wherein R' is hydrogen or methyl, ethyl, propyl or butyl, and R" and R'" are independently hydrogen, methyl, ethyl, propyl or butyl, (B) comonomer units (2) are incorporated at 1% to 75% by weight, preferably 10% to 60% by weight, more preferably 20% to 50% by weight having the copolymerizable structure represented by (2):

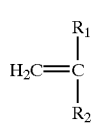

(2)

wherein $R_1$ is hydrogen or methyl and $R_2$ is a sulfo, sulfophenyl, sulfoalkyl, sulfoalkyl amido, (collectively, "sulfo groups"), or phosphonic acid ($-PO_3^{2-}$) (phosphono) group, including sodium, potassium, ammonium, calcium, magnesium and partial salts or mixed salts. Alternatively (2) can be comprised of a mixture of two or more different monomers containing sulfo and/or phosphono groups. The $R_2$ alkylene units contain $C_2$–$C_{10}$ groups, or alkyl benzyl groups containing $C_7$–$C_{16}$ carbon atoms, including mixtures thereof;

(C) from 0.01% by weight to 2% by weight on total weight of comonomers of a copolymerizable crosslinker either as a copolymerized comonomer, or crosslinked during and/or after copolymerization.

Optional, but preferred comonomers include vinylacylamides having the structure

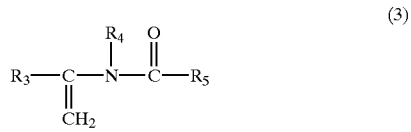

(3)

wherein $R_3$ is hydrogen, methyl, or ethyl, $R_4$ is hydrogen, methyl or ethyl, $R_5$ is hydrogen, methyl, or ethyl; and optionally $R_4$ and $R_5$ form a cyclic amide. Comonomer (3) is incorporated at a level generally of from 1% to 50%, more particularly, from 2% to 40%, and more preferably, from 5% to 30% by weight on total comonomer weight.

The vinylacylamide comonomers suggestive of (3) include, but are not limited to N-vinyl acetamide, N-vinyl-N-methyl acetamide, N,N-dimethyl acetamide, N-vinyl-2-pyrrolidone, N-vinyl formamide (VF), and N-ethenyl-N-alkyl acetamide, and mixtures of two or more of such comonomers.

The comonomer according to (1) is the recognized class of N-substituted α,β-unsaturated carboxylic amides including any two or more thereof.

Representative preferred comonomer units according to (1) incorporated into the crosslinked copolymer, in amounts of from 1 to 90% by weight, preferably 20 to 75%, most preferably 30 to 65% by weight of the copolymer, are represented by

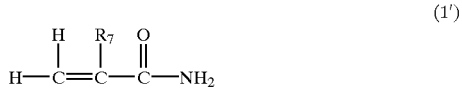

(1')

wherein $R_7$ is selected from the group consisting of hydrogen and alkyl groups containing from 1 to 4 carbon atoms, acrylamide (AM) being the most preferred comonomer according to (1'). Other comonomers representative of (1) or (1') include N-t-butyl acrylamide, N-cyclohexyl acrylamide, higher alkyl amides, where the alkyl group on the nitrogen contains from 8 to 32 carbon atoms. Acrylic amides include N-alkylol amides of alpha, beta-olefinically unsaturated carboxylic acids and having N-alkyl groups of from 4 to 10 carbon atoms such as N-methylol acrylamide, N-propylol acrylamide, N-methylol methacrylamide, N-methylol maleimide, N-methylol maleamic acid esters, N-methylol-p-vinyl benzamide, and the like.

The class of monomers representative of (2) are sulfonated and phosphono vinyl monomers. Representative of this class are vinyl sulfonate acid and salt (e.g., α-olefin sulfonate), 2-acrylamido-alkyl sulfonic acid, including salts, vinyl sulfonic acid, salts of vinyl sulfonic acid, vinyl benzene sulfonic acid, salts of vinyl benzene sulfonic acid, allyl sulfonic acid, salts of allyl sulfonic acid, methallyl sulfonic acid, salts of methallyl sulfonic acid, 3-methacrylamido-2-hydroxypropyl sulfonic acid, salts of 3-methacrylamido-2-hydroxypropyl sulfonic acid, and vinyl phosphonic acid, and combinations of two or more thereof; wherein said salts are salts of a cation selected from the group consisting of sodium, potassium, ammonium, calcium and magnesium.

Preferred comonomers according to (2) are the acrylamido alkyl $C_2$–$C_{10}$-alkylene, preferably $C_2$–$C_6$-alkylene, more preferably $C_4$-alkylene sulfonates.

The most preferred representative of (2) is 2-acrylamido-2-methylpropane sulfonate (AMPS) which has the structure (2')

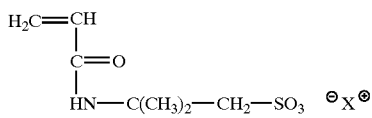

(2')

In the preferred copolymerizate, there is a mixture of the sulfonic acid and ammonium salt, in a relatively neutral pH from about 6 to 8, preferably around 7.

The most preferred optional comonomer incorporated randomly during polymerization at a level of from 10 to 30% by weight of the resulting crosslinked copolymer is a vinylacylamide monomer of the formula (3')

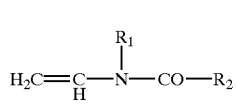

(3')

wherein $R_1$ is hydrogen and $R_2$ is hydrogen, methyl or ethyl.

The copolymers optionally can have randomly incorporated carboxylic acid comonomer, such as the olefinically-unsaturated carboxylic acids containing at least one activated carbon-to-carbon olefinic double bond, and at least one carboxyl group; that is, a carboxylic acid or another functional group that is readily converted to a carboxylic acid and containing an olefinic double bond reactive in polymerization because of its presence in the monomer molecule, either in the alpha-beta position with respect to a carboxyl group, —C=C—COOH; or as part of a terminal methylene grouping, $H_2C$=C<.

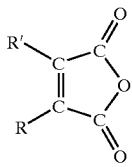

Olefinically-unsaturated acids of this class include such materials as the acrylic acids, e.g., acrylic acid itself, alpha-cyano acrylic acid, beta methylacrylic acid (crotonic acid), alpha-phenyl acrylic acid, beta-acryloxy propionic acid, cinnamic acid, p-chloro cinnamic acid, 1-carboxy-4-phenyl butadiene-1,3, itaconic acid, citraconic acid, mesaconic acid, glutaconic acid, aconitic acid, maleic acid, fumaric acid, and tricarboxy ethylene, and the like. As used herein, the term "carboxylic acid" includes the polycarboxylic acids and those acid anhydrides, such as maleic anhydride, wherein the anhydride group is formed by the elimination of one molecule of water from two carboxyl groups located on the same carboxylic acid molecule. Maleic anhydride and other acid anhydrides useful herein have the general structure wherein R and R' are selected from the group consisting of hydrogen, halogen and cyanogen (—C≡N) groups and alkyl, aryl, alkylaryl, arylalkyl, and cycloalkyl groups such as methyl, ethyl, propyl, octyl, decyl, phenyl, tolyl, xylyl, benzyl, cyclohexyl, and the like.

The preferred optional carboxylic acid comonomers are the monoolefinic acrylic acids having the general structure

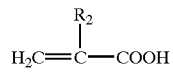

wherein $R_2$ is a substituent selected from the class consisting of hydrogen, halogen, and the cyanogen (—C≡N) groups, monovalent alkyl radicals, e.g., methyl, ethyl, etc., monovalent aryl radicals, monovalent aryl substituted alkyl radicals, monovalent alkyl substituted aryl radicals, and monovalent cycloaliphatic radicals. Of this class, acrylic (AA) and/or methacrylic acid are most preferred.

The copolymers can optionally be phosphonated by way of a copolymerizable phosphonic acid-containing monomer, such as vinyl phosphonic acid, methylvinyl phosphonic acid, polyvinylphosphonic acid, and their salts (referred to as phosphonates) or by reaction of the copolymer with a phosphonating agent such as phosphorus trichloride.

The copolymers contain comonomers that provide reactive sites for further optional external crosslinking of the copolymer insitu such as with the use of condensation resins, and multivalent metal salts (e.g. $Al^{3+}$, $Cr^{3+}$, $Fe^{3+}$, $Zr^{4+}$, and $Sn^{4+}$) including complexed types. Phosphonate groups can provide, in addition to reactive sites, additional adhesive forces at the interface between the copolymer and the solid surfaces. Phosphonate/phosphonic acid comonomer can be incorporated in the copolymer in an advantageous range of from 0.5% to 40% by weight, and preferably from 1% to 10% by weight.

The copolymers can optionally have incorporated therein a minor amount from 0.5% to 20% of a cationic functional comonomer. Typical cationic monomers contain a quaternary ammonium group. Preferred cationic comonomers are di-$C_1$–$C_4$ alkyl diallyl ammonium chloride, such as diallyl dimethyl ammonium chloride (DADMAC).

In one preferred embodiment a crosslinked copolymer contains incorporated randomly (A)–(E):

(A) from 20% to 75% by weight of comonomer units represented by (1):

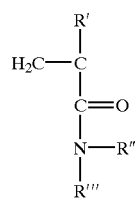

(1)

wherein R' is hydrogen or methyl, ethyl, propyl or butyl, and R" and R'" are independently hydrogen, methyl, ethyl or propyl;

(B) 20% to 50% by weight of the comonomer represented by (2):

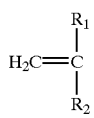
(2)

wherein $R_1$ is hydrogen or methyl and $R_2$ is a partial ammonium salt of a sulfo, sulfophenyl, or sulfoalkyl group, wherein said sulfoalkyl group contains a $C_2$–$C_{10}$ alkylene group or an alkyl benzyl groups containing $C_7$–$C_{16}$ carbon atoms, (C) from 0.01 to 2% by weight of a copolymerized ethylenic unsaturated multifunctional comonomer;

(D) from 2 to 40% by weight of a comonomer having the structure (3)

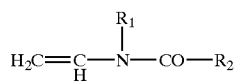
(3)

wherein $R_3$ is hydrogen, methyl, or ethyl, $R_4$ is hydrogen, methyl or ethyl, $R_5$ is hydrogen, methyl, or ethyl; and optionally $R_4$ and $R_5$ form a cyclic amide; and (E) from 0.5 to 40%, more preferably 1 to 40%, by weight of a comonomer according to (4)

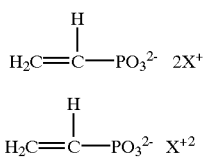
(4)

(4A)

wherein X is hydrogen or a monovalent or divalent cation, or mixture of cations selected from the group consisting of $Na^+$, $K^+$, $NH_4^+$, $Mg^{2+}$, and $Ca^{2+}$.

The crosslinked copolymers according to the invention are advantageously produced in a (1) dilute, agitated, aqueous solution polymerization (see Example 1). Other polymerization techniques that are well known to those skilled in the art that can be used with some pre- and post-polymerization adaptation are (2) suspension, (3) W/O emulsion, (4) precipitation and (5) gel polymerization methods. Adaptations in the relative amounts and types of initiator and crosslinking comonomer can be made to arrive at the crosslinked copolymers having the specified K-value according to the invention.

Aqueous agitated solution polymerization is illustrated hereinbelow.

The precipitation polymerization method (4) provides copolymerization in organic solvents that can be mixed with water. In this case, the copolymer is directly produced in solid form and can be isolated by removing the solvent and drying. Water-soluble (lower) alkanols, that is, those with 1 to 4 carbon atoms, such as methanol, ethanol, propanol, isopropanol, n-, sec- and iso-butanol, but preferably tert-butanol, can be considered as water-miscible organic solvents that are suitable solvents.

The water content of the lower alkanols used as solvents here should not exceed 5% by weight, otherwise clumping can occur during polymerization. The water content will preferably be not more than 3% by weight. The amount of solvent to use will be governed to a certain extent by the nature of the comonomers used. Generally 200 to 2000 g of solvent will be used per 100 g of total monomers. Aqueous non-gelled solutions containing the copolymer within the specified K-value range can be prepared by dissolving the copolymer in water, optionally warm and/or saline, agitating the solution until a homogeneous and continuous, pumpable solution is obtained. Typical aqueous copolymer weight percent concentrations range from 0.01% to 20%.

Polymerization by way of W/O emulsion (3) provides a water-in-oil emulsion in which aqueous monomer solution is emulsified in an organic solvent that is not miscible with water, such as cyclohexane, toluene, xylene, heptane, or high-boiling gasoline fractions with the addition of 0.5 to 8% by weight, preferably 1 to 4% by weight, of known W/O type emulsifying agents and then polymerized with conventional radical-forming initiators listed below. In this process, water-soluble monomer mixture and internal crosslinking comonomer are copolymerized in the hot state into copolymers having the specified K-value by first emulsifying the monomers or aqueous solutions thereof; water-in-oil emulsifiers being added in an organic solvent not miscible with water that forms the continuous phase, and this emulsion is heated in the presence of radical initiators. The comonomers to be used can be emulsified as such in the organic, water immiscible solvent, or they can be used in the form of an aqueous solution containing between 95 and 5% by weight of comonomers and up to 95% by weight of water, the composition of the aqueous solution depending on the solubility of the comonomers in water and the polymerization temperature to be used. The ratio between water and the monomer phase can be varied within a wide range and is generally 70:30 to 30:70.

To emulsify the monomer phase in the water immiscible organic solvent into a water-in-oil emulsion, 0.10 to 10% by weight (relative to the oil phase) of a water-in-oil emulsifier is added to the mixtures. Preference will be given to emulsifiers having a relatively low hydrophilic-lipophilic balance value. In principle, any inert, water insoluble liquid, that is, any hydrophobic organic solvent, can be used as the oil phase. Generally, use is made of hydrocarbons having a boiling point between 120 and 350° C. These hydrocarbons can be saturated, linear or branched paraffin hydrocarbons, or aromatic hydrocarbons such as toluene or xlyene.

Copolymers according to the invention can be obtained by carrying out the polymerization in the so-called "gel polymerization process" (6), with adaptations to provide the homogeneous, continuous aqueous solution at the desired concentration levels. This typically involves polymerization of 10% to 60% monomer active aqueous solutions of the comonomers with suitable conventional catalysts without mechanical mixing (agitation), making use of the Trommsdorf-Norrisch effect. Copolymerizable comonomer can be batch- charged along with the principal comonomers, yielding a uniform, random crosslinked copolymer structure, or a post-polymerization crosslinking method can be used in which crosslinking monomer is applied to a mass of copolymer in a carrier medium.

It is critical that crosslinking comonomers utilized in the preparation of the crosslinked water-soluble copolymer according to the invention are monomers which are uniformly and randomly copolymerized, or uniformly graft-linkable into the copolymer, Crosslinking comonomers react with a radical or abstractable hydrogen at more than one site in or between polymer chains. Bonding sites can be intramolecular (branching) and intermolecular, linking chains together by covalent bonds or crosslink at the incorporation point. There is a low degree of intermolecular networking, below the level recognizable by the skilled person in light of this description, which gives rise to a poorly pumpable gel. The crosslinked copolymers herein forming a stable, non-gelled solution as a result of obtaining a molecular size or weight, as characterized by the herein mentioned K-value test, of from 220 to 450. Below and above this range, less than desired developed solution RPM properties and lack of substrate perfusion, respectively, are typically experienced.

Examples of useful multifunctional crosslinking monomers include multifunctional acrylamides, and (meth) acrylates containing unsaturation at preferably 2, and optionally 3 or more sites on each copolymerizable comonomer molecule. In one embodiment, the multifunctional crosslinking monomers are selected from the group consisting of monomeric polyesters of acrylic or methacrylic acids and polyhydric alcohols; and monomeric polyalkenyl polyethers of polyhydric alcohols containing from 2 to about 6 polymerizable alkenyl ether groups per polyether molecule. Another exemplary crosslinking monomer is a monomeric polyester of an acrylic or methacrylic acid and a polyhydric alcohol containing from 2 to about 6 polymerizable α,β-unsaturated acrylic groups per polyester molecule. Other copolymerizable crosslinking monomers include divinyl ether, ethylene glycol dimethacrylate, (m)ethylenebisacrylamide, allylpentaerythritol, and the like. The preferred crosslinking comonomers are somewhat water soluble and monomer soluble.

Specific examples of other crosslinking monomers include trimethylol propane triacrylate (TMPTA), trimethylol propane trimethacrylate (TMPTMA); diethylene glycol diacrylate (DEGDA), diethylene glycol dimethacrylate (DEGDMA), trimethylene glycol diacrylate, butylene glycol diacrylate, methylene-bis-acrylamide, pentamethylene glycol diacrylate, octylene glycol diacrylate, glyceryl diacrylate, glyceryl triacrylate, neopentyl glycol diacrylate, the tetraacrylate ester of pentaerythritol, etc.

It is understood that certain monounsaturated monomers may act in varying degrees to crosslink or branch the water soluble copolymer of the invention. For example, acrylate monomers with abstractable hydrogens, which can function as radical reactive sites, can in some embodiments of this invention, form a more branched or crosslinked polymer, thus affecting the preferred levels of the polyethylenic unsaturated crosslinking comonomers. An example of a monounsaturated monomer with an abstractable hydrogen is 2-ethylhexyl acrylate.

Optional heat-reactive, latent carboxy- or hydroxy-reactive internal crosslinking system can be provided by the incorporation of carboxylic-group containing comonomers, and N-alkylol amides, for example, N-methylol acrylamide, N-propylol acrylamide, N-methylol methacrylamide, N-methylol maleimide, N-methylol maleamic acid esters, N-methylol-p-vinyl benzamide, and the like.

Known methods for optional post-polymerization crosslinking of carboxylic acid containing copolymers include U.S. Pat. No. 4,666,983 (crosslinking agent without any carrier solvent), using e.g. polyhydric alcohols, polyglycidyl ethers, polyfunctional amines and polyfunctional isocyanates. U.S. Pat. No. 4,507,438 and 4,541,871 utilize a difunctional compound in water with inert solvent or mixture of solvents. The difunctional compounds include glycidyl ethers, haloepoxies, aldehydes and isocyanates with ethylene glycol diglycidyl ether crosslinker. The solvents include polyhydric alcohols with ethylene glycol, propylene glycol and glycerine enumerated as preferred polyhydric alcohols. U.S. Pat. No. 5,140,076 teaches a water-solvent-crosslinker mixture. Crosslinkers such as polyhydric alcohol, diglycidyl ether, polyaziridene, urea, amine and ionic crosslinkers are suggested.

The crosslinked, water soluble copolymers are produced in the most preferred manner of a dilute aqueous solution polymerization to yield directly from the polymerization vessel, a non-gelled, dilute, aqueous solution having continuous-flow pumpability in a positive-displacement pump. Alternatively, if the crosslinked copolymer is isolated from the reaction vessel and dried in solid form after elimination of the water in conventional drying processes, it can be redissolved in water after comminution with suitable equipment and then used according to the present invention.

In general, the polymerization reaction is preferably carried out in a temperature range of from 0° C. to 150° C., preferably 10 ° C.–125° C., more preferably from 20°, to 110° C., and under ambient (standard) or increased pressure. Polymerization is generally carried out in an atmosphere of protective gas, preferably nitrogen. Particular attention to elimination of oxygen is critical.

Polymerization can be initiated by high-energy electromagnetic radiation or conventional chemical initiators. The latter include, but are not limited to, organic peroxides such as benzoperoxide, tert.- butylperoxide, methyl ethyl ketone peroxide, cumene hydroperoxide, azoic compounds, for example, azodiisobutyronitrile or 2,2'-azobis-(2-amidinopropane)-dihydrochloride, as well as inorganic peroxy compounds, for example, $(NH_4)_2S_2O_8$, $K_2S_2O_8$, or $H_2O_2$, perhaps in combination with reducing agents, for example, sodium hydrosulfite and iron-II-sulfate or redox systems, the reducing components being an aliphatic and aromatic sulfinic acid, for example, benzene sulfinic acid and toluene sulfinic acid or derivatives of these acid such as Mannich adducts of sulfinic acid, aldehydes and amino compounds. As a rule, 0.002 to 2 g of the polymerization initiator is used per 100 g of total monomers. If more initiator is used, it may be required to utilize more crosslinker than specified herein above, which will be apparent to skilled practitioners.

It is possible to make an addition to the polymerization recipe, according to the invention, of from about 0.01 to about 2%, on the total weight of the copolymerizable comonomers charged to the reaction zone, so-called moderators which harmonize the course of the reaction in that they flatten the reaction rate-time diagram. They may lead to an improvement in the reproducibility of the reaction and thus make it easier to produce uniform products with reduced K-value variability. Examples of suitable moderators of this type include nitrilo-tris-propionylamide, monoalkylamines, dialkylamines or trialkylamines such as diisbutylamine, for example. Such moderators can also be used to advantage in the production of the copolymers according to the invention, but are not essential in the practice of the invention.

Chain-transfer agents (CTA's) can also be added to the polymerization recipe before or during polymerization, or in conjunction with the post-polymerization, in-reactor crosslinking. Examples of conventional CTA's include the alcohols, e.g., methanol, ethanol, propanol, isopropanol, n-butanol, sec. -butanol and amyl alcohols, alkyl mercaptans such as dodecyl mercaptan and amyl alcohols, alkyl mercaptans such as dodecyl mercaptan and tert. dodecyl mercaptan, isooctylthioglycolate and some halogen compounds such as carbon tetrachloride, chloroform and methylene chloride. If chain transfer agent is used, it will be apparent to skilled practitioners to alter the polymerization process by adjusting the initiator type or concentration, temperature of reaction, monomer concentration, and/or amount of crosslinking monomer charged, by routine trial and error to provide a copolymer K-value in the range according to the invention.

The treatment solution of water-soluble, crosslinked copolymer according to the invention can be prepared with tap or deionized water, or proportioned to some extent with salt solution. Optionally at the well-bore site, produced water, which is in the nature of a brine obtained from the drilling site, could be added to the crosslinked copolymer solution. Generally, the treatment solution which is in a form for injecting underground, can be further diluted in water, whether DI, fresh, salt or brine water.

EXAMPLES

As an example, an aqueous solution polymerization method was used to make a crosslinked water soluble copolymer according to the invention. Comparative copolymers are illustrated in Table 1.

A monomer solution was prepared in a beaker under agitation wherein 650.0, g of deionized water, 25 mg of EDTA (ethylenediaminetetraacetic acid), 7.5 g of AMPS (2-acrylamido-2-methyl-propane sulfonic acid), and 27.5 g of 50% aqueous acrylamide were combined. Once the EDTA and AMPS were fully dissolved by stirring, the solution pH was adjusted to approximately 7.8 by adding 3.3 g of 28% aqueous ammonia. After the pH was adjusted, 3.75 g of technical grade N-vinylformamide and 2.5 g of a 1% aqueous solution of crosslinking monomer were added. After mixing, the homogeneous monomer solution was transferred to a 500 mL glass resin flask (actual capacity is greater than 500 mL) fitted with an overhead stirrer, sub-surface nitrogen inlet, and a thermocouple. One side neck was left with an opening to the atmosphere. The stirring solution was then deoxygenated with nitrogen at ambient temperature and during a heating of the solution to 60° C. At a temperature of 60° C., the nitrogen purge was reduced to a moderate level and 30 mg of 2,2'-azobis(2-amidinopropane) dihydrochloride initiator was added to the solution. The solution was then stirred at low speed for 5 hours while maintaining the temperature at around 60° C. The solution viscosity increased during the 5 hour period. After polymerization, the percent solids and K-value were determined. Solids content, measured by a microwave oven method, were 3.5% and the K-value was determined to be 255. The K-value was determined by analyzing the viscosity of a 0.5% active solution at 25° C. in an Ubbelohde capillary viscometer (size 2C).

To provide improved handling, the crosslinked copolymer was further diluted in water and salt was added. In this example, 250.5 g of the product described above was transferred to a separate beaker. The polymer content was adjusted to 3.0% solids by adding 33.9 g water based on the measured % solids. Furthermore, 2.9 g sodium chloride, approximately 1% of the total mass of the 3.0% polymer solution, was added to reduce the polymer solution viscosity. The resulting homogeneous crosslinked copolymer solution had a Brookfield viscosity (25° C., spindle LV4, 60 rpm) of 3520 cPs, a 1% DMW pH of 6.4, and percent polymer of 3.1 % (% polymer equals % solids minus % sodium chloride).

The crosslinked copolymers of the present invention have no readily definable molecular weight due to the intermolecular crosslinking of the polymer chains. The Fikentscher value, or K-value measurement is a way to indirectly indicate molecular weight and/or size of the copolymers, accordingly. A higher K-value corresponds to a polymer of comparatively larger molecular weight and/or size or one that exhibits greater chain entanglement behavior.

To determine the K-value, the copolymer is dissolved to a 0.5% concentration in deionized water and the flow-out time is determined at 25° C. by means of a Ubbelohde capillary viscometer. This value gives the absolute viscosity (eta-c) of the solution. The absolute viscosity of the solvent is eta-0. The ratio of the two absolute viscosities gives the relative viscosity $$z = \frac{eta\text{-}c}{eta\text{-}0}$$

from the relative viscosities of the function of the concentration. The K-value can be determined by means of the following equation:

$$\text{Log } z = \left| \frac{75 * k^2}{1 + 1.5\, kc} + k \right| * c$$

An Ubbelohde type 2C. viscometer available from Cannon Instrument Co. is used for the K-value measurement.

Testing Water Permeability Modification of Substrate Cores

A suitable test method to demonstrate the effectiveness of synthetic water-soluble copolymers on modifying the flow resistance of water and gas in a porous medium utilizes nitrogen as a substitute for natural gas. The porous media are selected and their porosities are characterized. In one instance Vosges sandstone with a permeability of K=53 mD (53*10 fm2) and Oberkirchen sandstone with a permeability of K=5.4 mD (5.4*10 fm2) can be used as representative subterranean formations. Serving as the "deposit water" and at the same time as solvent for the copolymers is an aqueous solution with a salt content of 97.5 g NaCl and 2.5 g $CaCl_2$ per 100 g of water.

The tests are organized into the following steps:

(1) Measurement of the permeability for nitrogen of the water-free rock core k1.

(2) Saturation of the porous medium with "deposit water" (=pore water);

(3) Determination of the pressure gradient ($\Delta p_1$) for the flow of water with constant rate $q_1$, (4) Saturation of the porous medium with an aqueous copolymer solution.

(5) Displacement of the excess copolymer solution by "deposit water" until there is an equilibrium between this pore water and the adsorbing copolymer.

(6) Measurement of pressure gradient ($\Delta p_1/L$) for water with a flow rate $q_1$, in the presence of the adsorbed polymer.

(7) Displacement of the water with nitrogen and measurement of the permeability for nitrogen in the presence of the adsorbed polymer k2.

After these preparatory steps, which are known to specialists in the field and need not be stated in detail, a determination is made of the residual flow resistance for the "deposit water" and the nitrogen:

*$RRFw = \Delta p_2/\Delta p_1$*

*$RRFg = k1/k2$* where k:: Permeability of the rock depending on the pore size: 1 square micrometer=1 darcy RRF: Residual resistance factor RRFw: Residual resistance factor of the deposit water RRFg: Residual resistance factor of the gas (nitrogen)

L: Length of the rock core (m)

p: Pressure drop over the core (Pa)

q: Flow rate of the water (m3 s-1)

TABLE 1

| Example | Weight percent comonomer | | | | | | | K-value |
|---------|------|-----|--------|----|----|----|-----|-----|
|         | AMPS | VPS | DADMAC | AA | VF | AM | XL  |     |
| Comp A  | 30   | 0   | 0      |    | 15 | 55 | 0   | 228 |
| Comp B  | 30   | 0   | 0      | 0  | 15 | 55 | 0.1 | 210 |
| Comp C¹ | 37   | 1   | 0      | 0  | 4  | 58 | 0   | 312* |
| Ex 1    | 40   | 0   | 0      | 0  | 5  | 55 | 0.1 | 243 |
| Ex 2    | 30   | 0   | 0      | 0  | 15 | 55 | 0.1 | 255 |
| Ex 3    | 28   | 2   | 0      | 0  | 15 | 55 | 0.1 | 220 |
| Ex 4    | 28   | 0   | 0      | 2  | 15 | 55 | 0.1 | 240 |
| Ex 5    | 28   | 0   | 2      | 0  | 15 | 55 | 0.1 | 235 |

XL = crosslinking comonomer - methylene bis acrylamide; *measured as 0.25% solution Notes:

Comp. Examples A and B, and Examples 1 to 5 were polymerized by agitated aqueous solution polymerization.

Comp. Example C was prepared by gel polymerization according to U.S. Pat. No. 5,379,841.

I claim:

1. A dilute, nonlled, homogeneous aqueous solution of a relative permeability modifying copolymer, said copolymer characterized as a crosslinked synthetic copolymerizate based on N-substituted α,β-unsaturated carboxylic amide, a vinyl acylamide comonomer, and sulfonated vinyl monomer, which has a balance of intramolecular and intermolecular crosslinking to provide infectivity in porous underground formations, and providing relative permeability modifying properties, wherein said copolymerizate is characterized by a molecular size as measured by the K-value test in a range of from 220 to 450.

2. The solution of claim 1 wherein said crosslinked copolymer comprises (A) 1% to 90%, by weight of comonomer units (1) having the copolymerizable structure represented by (1):

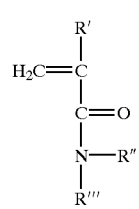

(1)

wherein R' is hydrogen, methyl, ethyl, propyl, or butyl, and R" and R'" are independently hydrogen, methyl, ethyl or propyl or butyl; and (B) 1% to 75% by weight of comonomer units (2),

(2)

wherein $R_1$ is hydrogen or methyl and $R_2$ is a sulfo, sulfophenyl, suffoalkyl, sulfoalkyl amido, and sodium, potassium, ammonium, calcium, magnesium, partial salts or mixed salts thereof and wherein the $R_2$ sulfoalkyl units contain $C_2$–$C_{10}$ alkylene groups, and the sulfophenyl group includes alkyl benzyl groups containing $C_7$–$C_{16}$ carbon atoms; and, (C) 1 to 50% by weight of comonomer (3),

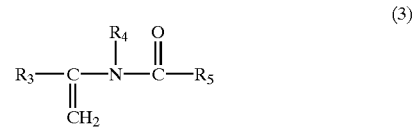

(3)

wherein $R_3$ is hydrogen, methyl, or ethyl, $R_4$ is hydrogen, methyl or ethyl, $R_5$ is hydrogen, methyl, or ethyl; and optionally $R_4$ and $R_5$ form a cyclic amide.

3. The solution of claim 2 wherein said crosslinked copolymer comprises from 20% to 75% by weight of (1) and from 10% to 60% by weight of (2).

4. The solution of claim 3 wherein said crosslinked copolymer comprises 30% to 65% by weight of (1) and from 20% to 50% by weight of (2).

5. The solution of claim 2 wherein said crosslinked copolymer further comprises 0.5 to 40% by weight of a comonomer according to (4) or (4A)

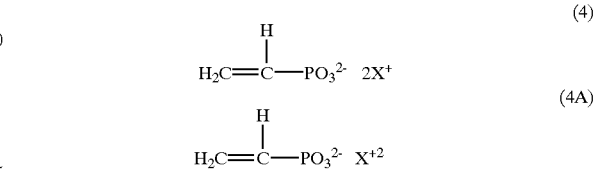

wherein $X^+$ and $x^{+2}$ are monovalent and divalent cations, respectively, including a mixture of cations, and $X^+$ and $X^{+2}$ are selected from the group consisting of $H^+$, $Na^+$, $K^+$, $NH_4^+$, $Mg^{2+}$, and $Ca^{2+}$.

6. The solution of claim 2 wherein said crosslinked copolymer contains from 2% to 40% by weight of (3).

7. The solution of claim 2 wherein said crosslinked copolymer contains from 5% to 30% by weight of (3).

8. The solution of claim 2 wherein (3) is selected from the group consisting of to N-vinyl acetamide, N-vinyl-N-methyl acetamide, N,N-dimethyl acetamide, N-vinyl-2-pyrrolidone, N-vinyl formamide, N-ethenyl-N-alkyl acetamide, and mixtures.

9. The solution of claim 2 wherein (1) is selected from the group consisting of acrylamide, methacrylamide, N-methylmethacrylamide, N-alkyl ($C_1$–$C_4$) methacrylamide, N,N-dialkyl ($C_1$–$C_4$) methacrylamide, N-alkyl ($C_1$–$C_4$) acrylamide, N,N-dialkyl ($C_1$–$C_4$) acrylamide, and combinations thereof.

10. The solution of claim 2 wherein (2) is selected from the group consisting of are 2-acrylamido-alkyl ($C_2$–$C_{10}$)

sulfonic acid, vinyl sulfonic acid, vinyl benzene sulfonic acid, allyl sulfonic acid, methallyl sulfonic acid, 3-methacrylamido-2-hydroxypropyl sulfonic acid, and/or the salts of any of the foregoing, and combinations of two or more of the foregoing, wherein said salts are salts of a cation selected from the group consisting of sodium, potassium, ammonium, calcium, magnesium, and mixtures thereof.

11. The solution of claim 2 wherein said copolymer further comprises copolymerized olefinically-unsaturated carboxylic acid comonomer containing at least one activated carbon-to-carbon olefinic double bond, and at least one carboxyl group, said olefinic unsaturated group either in the alpha-beta position with respect to said carboxylic acid group, or as part of a terminal methylene grouping.

12. The solution of claim 11 wherein said carboxylic acid comonomer is selected from the group consisting of acrylic acid, alpha-cyano acrylic acid, beta methylacrylic acid, alpha-phenyl acrylic acid, beta-acryloxy propionic acid, cinnamic acid, p-chloro cinnamic acid, 1-carboxy-4-phenyl butadiene-1,3, itaconic acid, citraconic acid, mesaconic acid, glutaconic acid, aconitic acid, maleic acid, fumaric acid, and tricarboxy ethylene.

13. The solution of claim 2 wherein said crosslinked copolymer is crosslinked by the incorporation of multifunctional crosslinking monomer selected from the group consisting of acrylic or methacrylic acids, acrylic or methacrylic amides, polyhydric alcohols, monomeric polyalkenyl polyethers of polyhydric alcohols containing from 2 to about 6 polymerizable alkenyl ether groups per polyether molecule, a monomeric polyester of an acrylic or methacrylic acid and a polyhydric alcohol containing from 2 to about 6 polymerizable α,β-unsaturated acrylic groups per polyester molecule.

14. The solution of claim 13 wherein said crosslinked copolymer is crosslinked by incorporation of multifunctional crosslinking monomer selected from the group consisting of divinyl ether, ethylene glycol dimethacrylate, (m)ethylene-bisacrylamide, allylpentaerythritol, trimethylol propane triacrylate (TMPTA), trimethylol propane trimethacrylate (TMPTMA), diethylene glycol diacrylate (DEGDA), diethylene glycol dimethacrylate (DEGDMA), trimethylene glycol diacrylate, butylene glycol diacrylate, methylene-bis-acrylamide, pentamethylene glycol diacrylate, octylene glycol diacrylate, glyceryl diacrylate, glyceryl triacrylate, neopentyl glycol diacrylate, and the tetraacrylate ester of pentaerythritol.

15. A dilute, non-gelled, homogeneous aqueous solution of a copolymer, said copolymer characterized as a crosslinked synthetic copolymerizate incorporated randomly (A)–(E):

(A) from 20% to 75% by weight of comonomer units represented by (1):

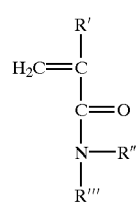

(1)

wherein R' is hydrogen or methyl, ethyl, propyl or butyl, and R" and R'" are independently hydrogen, methyl, ethyl or propyl;

(B) 10% to 60% by weight of the comonomer represented by (2):

(2)

wherein $R_1$ is hydrogen or methyl and $R_2$ is a sulfo, sulfophenyl, or sulfoalkyl group, and/or salt thereof containing at least one cation selected from the group consisting of $H^+$, $Na^+$, $K^+$, $NH_4^+$, $Mg^{2+}$, and $Ca^{2+}$, and wherein said sulfoalkyl group contains a $C_2$–$C_{10}$ alkylene group and the sulfophenyl group includes alkyl benzyl groups containing $C_7$–$C_{16}$ carbon atoms, (C) from 0.01 to 2% by weight of a copolymerized ethylenic unsaturated multifunctional comonomer;

(D) from 2 to 40% by weight of a comonomer having the structure (3)

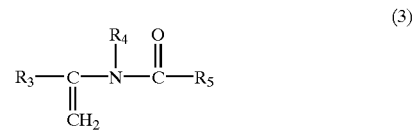

(3)

wherein $R_3$ is hydrogen, methyl, or ethyl, $R_4$ is hydrogen, methyl or ethyl, $R_5$ is hydrogen, methyl, or ethyl; and optionally $R_4$ and $R_5$ form a cyclic amide; and (E) from 0.5 to 40% by weight of comonomer according to (4) or (4A)

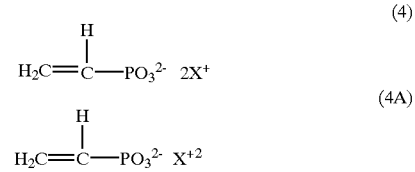

(4)

(4A)

wherein X is a monovalent or divalent cation, or mixture of cations selected from the group consisting of $H^+$, $Na^+$, $K^+$, $NH_4^+$, $Mg^{2+}$, and $Ca^{2+}$.

16. A process for modifying the permeability of subterranean water-producing formation comprising injecting into said formation a dilute homogeneous aqueous solution of a crosslinked copolymerizate, said copolymerizate comprising a major amount (>50% by weight) of copolymerized acrylic amide and sulfonated vinyl comonomer and an effective amount of crosslinking monomer, said amount providing a balance of intermolecular and intramolecular crosslinking thereby providing said copolymerizate in the form of said homogeneous, aqueous. solution in a non-gelled state, said copolymer has a K-value of from 220 to 450.

17. The process of claim 16 further comprising the step of injecting an external crosslinker into said formation.

18. A non-gelled, anionic, crosslinked, water-soluble, synthetic copolymer which forms a homogeneous aqueous flowable solution under conventional pumping pressures encountered in injecting polymer solutions into underground oil and gas formations, said copolymer comprising greater than 50% by weight of three comonomer components (1)

copolymerized sulfonated vinyl comonomer, (2) N-substituted α,β-unsaturated carboxylic amide, (3) a vinylacylamide comonomer, and (4) a minor but effective amount of polyethylenic unsaturated copolymerizable comonomer, such amount providing a randomly crosslinked copolymer characterized by not forming a gel in aqueous solution and having a K-value in the range of from 220–450.

19. An aqueous, dilute, agitated solution polymerization method for making anionic, crosslinked, non-gelled, water-soluble, synthetic copolymerizates as claimed in claim 2, comprising the steps of (1) forming an agitated aqueous monomer solution, said monomer solution comprising a crosslinking comonomer, and (A) from 1 to 90 % by weight on total comonomer weight of N-substituted α,β-unsaturated carboxylic amide, (B) from 1 to 75% by weight of comonomer represented by (2):

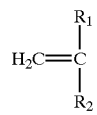
(2)

wherein $R_1$ is hydrogen or methyl, $R_2$ is an sulfo, sulfophenyl, sulfoalkyl, sulfoalkyl amid o, including the salt form as a sodium, potassium, ammonium, calcium, or magnesium salt, including partial or mixed salts thereof, (2) deoxygenating said solution, (3) heating said solution, (4) initiating a polymerization reaction, (5) converting said monomers to said homogeneous aqueous copolymer solution, wherein said copolymer has a molecular size according to the K-value test of from 220 to 450.

20. The process of claim 19 wherein said N-substituted (α,β-unsaturated carboxylic amide is represented by (1):

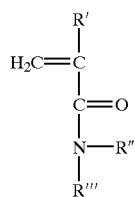
(1)

wherein R' is hydrogen or methyl, and R" and R'" are independently hydrogen, methyl, ethyl or propyl or butyl.

21. A dilute, non-gelled, homogeneous, aqueous solution useful for direct injection into subterranean formations comprising water and an anionic copolymer, said copolymer is internally crosslinked, said copolymer has a relative molecular size as measured by a K-value test of from 220 to 450, said copolymer comprises:

1 to 95 % by weight of total comonomer units based on N-substituted α,β-unsaturated carboxylic amide; 1 to 75% of comonomer units of structure represented by (2):

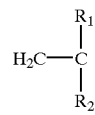
(2)

wherein $R_1$ is hydrogen or methyl, $R_2$ is an sulfo, sulfophenyl, sulfoalkyl, sulfoalkyl amido, including the salt form with sodium, potassium, ammonium, calcium, or magnesium salts thereof, including partial or mixed salts; and, 1to 50% by weight of (3)

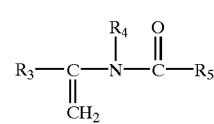
(3)

wherein $R_3$ is hydrogen, methyl, or ethyl, $R_4$ is hydrogen, methyl or ethyl, $R_5$ is hydrogen, methyl, or ethyl; and optionally $R_4$ and $R_5$ form a cyclic amide.

22. The solution of claim 21 wherein said N-substituted carboxylic acid is represented by (1):

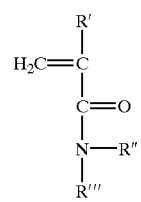
(1)

wherein R', R" and R'" are hydrogen.

23. The solution of claim 21 wherein said structure (2) is selected from the group consisting of 2-acrylamido-2-methylpropanesulfonic acid, salts (alkali metal or ammonium) of 2-acrylamido-2-methylpropane sulfonic acid, vinyl sulfonic acid, salts of vinyl sulfonic acid, vinyl benzene sulfonic acid, salts of vinyl benzene sulfonic acid, allyl sulfonic acid, salts of allyl sulfonic acid, methallyl sulfonic acid, salts of methallyl sulfonic acid, 3-methacrylamido-2-hydroxypropyl sulfonic acid, salts of 3-methacrylamido-2-hydroxypropyl sulfonic acid and combinations thereof.

24. The solution of claim 2 wherein said copolymer has a K-value of from 230 to 350.

25. The solution of claim 15 wherein (1) is selected from the group consisting of acrylamide, methacrylamide, N-methylmethacrylamide, N-alkyl ($C_1$–$C_4$)methacrylamide, N,N-dialkyl ($C_1$–$C_4$) methacrylamide, N-alkyl ($C_1$–$C_4$) acrylamide, N,N-dialkyl ($C_1$–$C_4$) acrylamide, and combinations.

26. The solution of claim 15 wherein (2) is selected from the group consisting of are 2-acrylamido-alkyl ($C_2$–$C_{10}$) sulfonic acid, vinyl sulfonic acid, vinyl benzene sulfonic acid, allyl sulfonic acid, methallyl sulfonic acid, 3-methacrylamido-2-hydroxypropyl sulfonic acid, including the salts of any of the foregoing, wherein said salts are salts of a cation selected from the group consisting of sodium, potassium, ammonium, calcium, and magnesium, including mixtures thereof.

27. The solution of claim 15 wherein said copolymer further comprises copolymerized olefinically-unsaturated carboxylic acid comonomer containing at least one activated carbon-to-carbon olefinic double bond, and at least one carboxyl group, said olefinic unsaturated group either in the alpha-beta position with respect to said carboxylic acid group, or as part of a terminal methylene grouping.

28. The solution of claim 15 wherein said copolymer has a K-value of from 230 to 350.

29. The solution of claim 2 wherein said crosslinked copolymer further comprises incorporated therein, a cationic comonomer which contains a quaternary ammonium group.

30. The solution of claim 29 wherein said cationic comonomer is a di-$C_1$–$C_4$ alkyl diallyl ammonium chloride.

31. The solution of claim 30 wherein said di-$C_1$–$C_4$ alkyl diallyl ammonium chloride is diallyl dimethyl ammonium chloride.

32. The solution of claim 29 wherein said cationic comonomer is present at from 0.5% to 20% by weight.

33. The solution of claim 14 wherein said crosslinked copolymer further comprises incorporated therein, a cationic comonomer which contains a quaternary ammonium group.

34. The solution of claim 33 wherein said cationic comonomer is a di-$C_1$–$C_4$ alkyl diallyl ammonium chloride.

35. The solution of claim 34 wherein said di-$C_1$–$C_4$ alkyl diallyl ammonium chloride is diallyl dimethyl ammonium chloride.

36. The solution of claim 35 wherein said cationic comonomer is present at from 0.5% to 20% by weight.

37. A dilute non-gelled homogeneous aqueous flowable solution of a copolymer, said copolymer characterized as a crosslinked synthetic copolymerizate having a K-value of from 220–450 and comprising randomly incorporated comonomers (A) to (D) where said composition incorporates:

(A) from 20% to 76% by weight of comonomer units represented by (1):

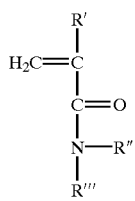

wherein R' is hydrogen or methyl, ethyl, propyl or butyl, and R" and R''' are independently hydrogen, methyl, ethyl or propyl;

(B) 10% to 60% by weight of the comonomer represented by (2):

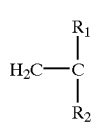

wherein $R_1$ is hydrogen or methyl and $R_2$ is a sulfo, sulfophenyl, or sulfoalkyl group, and/or salt thereof containing at least one cation selected from the group consisting of $H^+$, $Na^+$, $K^+$, $NH^{4+}$, $Mg^{2+}$ and $Ca^{2+}$ and wherein said sulfoalkyl group contains a $C_2$–$C_{10}$ alkylene group and said sulfophenyl group includes alkyl benzene groups containing $C_7$–$C_{16}$ carbon atoms;

(C) from 0.01 to 2% by weight of a copolymerized ethylenic unsaturated multifunctional crosslinking comonomer, and (D) is a comonomer having the structure (3)

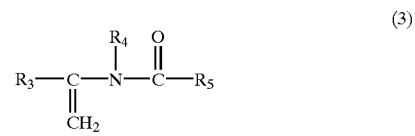

wherein $R_3$ is hydrogen, methyl, or ethyl, $R_4$ is hydrogen, methyl or ethyl, $R_5$ is hydrogen, methyl, or ethyl; and optionally $R_4$ and $R_5$ form a cyclic amide.

38. The solution of claim 37, further comprising at least one of (E) a cationic comonomer which contains a quaternary ammonium group, (F) a comonomer having the structure

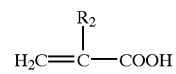

wherein $R_2$ is a substituent selected from the class consisting of hydrogen, halogen, and the cyanogen (—C≡N) groups, monovalent alkyl radicals, e.g., methyl, ethyl, etc., monovalent aryl radicals, monovalent aryl substituted alkyl radicals, monovalent alkyl substituted aryl radicals, and monovalent cycloaliphatic radicals, and (G) a comonomer according to (4) or (4A)

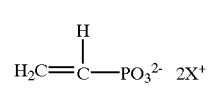

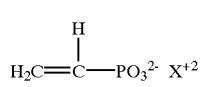

wherein $X^+$ and $X^{+2}$ are monovalent or divalent cations, respectively, including a mixture of cations and $X^+$ and $X^{+2}$ are selected from the group consisting of $H^+$, $Na^+$, $K^+$, $NH_4^+$, $Mg^{2+}$, and $Ca^{2+}$.

* * * * *

UNITED STATES PATENT AND TRADEMARK OFFICE
CERTIFICATE OF CORRECTION

PATENT NO. : 6,465,397 B1
DATED : October 15, 2002
INVENTOR(S) : Daniel Bruce Patterson It is certified that error appears in the above-identified patent and that said Letters Patent is hereby corrected as shown below:

Column 15,
Line 37, please change the word "nonelled" to -- non-gelled --.
Line 43, please change the word "infectivity" to -- injectivity --.

Signed and Sealed this

Tenth Day of December, 2002

JAMES E. ROGAN
*Director of the United States Patent and Trademark Office*